Figure 1:
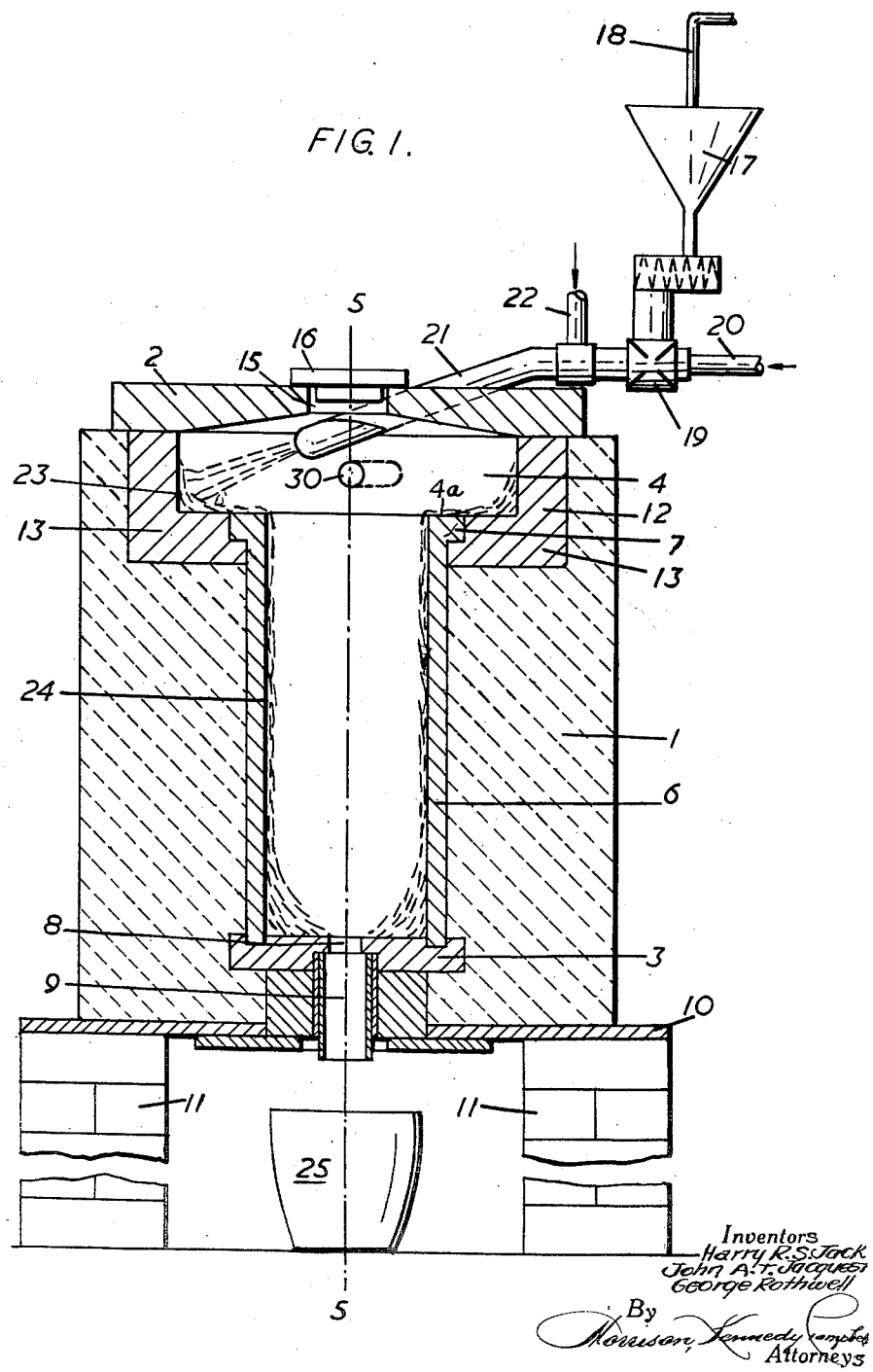

Feb. 12, 1963   H. R. S. JACK ET AL   3,077,094
MELTING OF GLASS BATCH
Filed Sept. 3, 1958   2 Sheets-Sheet 2

Inventors
Harry R. S. Jack
John A. T. Jacquest
George Rothwell
By
Morrison, Kennedy Campbell
Attorneys United States Patent Office 3,077,094
Patented Feb. 12, 1963

3,077,094
MELTING OF GLASS BATCH
Harry R. S. Jack, John A. T. Jacquest, and George Rothwell, Eccleston, St. Helens, England, assignors to Pilkington Brothers Limited, Liverpool, England, a corporation of Great Britain
Filed Sept. 3, 1958, Ser. No. 758,704
Claims priority, application Great Britain Sept. 10, 1957
6 Claims. (Cl. 65—136)

This invention relates to the melting of glass batch.

A main object of the present invention is to devise an improved method of melting glass batch and apparatus therefor which ensures that the whole of the batch is melted by furnace gases rapidly and homogeneously and without recirculation currents.

A process of producing molten glass from particulate glass making material, according to the present invention, is characterized by the fact that the particulate material is delivered in gaseous suspension into a melting zone, the melting zone being formed in a cylindrical upper part of a furnace chamber by projecting gaseous products of combustion tangentially into the said chamber part so that an elongated helical path for the gases is concentrated in the chamber part, which gases in conjunction with the chamber wall form the melting zone, into which zone the dispersed particulate material is delivered tangentially of the zone and achieves a residence period during which the particulate material is rapidly and uniformly melted, regulating the rate of delivery of the particulate material to the melting zone so as to maintain a flow of molten glass in thin layer form down the wall of the chamber, and discharging the molten glass at the lower end of the chamber.

Conveniently, the delivery of the particulate material into the melting zone in suspended (or dispersed) condition is carried out by utilizing the projected stream of gaseous products of combustion as the means of projecting the particulate material of suspension into the melting zone.

From this aspect the process of producing molten glass from particulate glass making material in accordance with the invention, is characterized by the steps of delivering the particulate material in suspension in combustion gases into a furnace chamber by projecting the suspension tangentially into a cylindrical upper part of the chamber to attain a rotary motion in the chamber for the gases in a helical path, so that an elongated path for the burning gases is concentrated in the chamber and in conjunction with the chamber wall forms a melting zone for the particulate material, the particulate material in suspension being wholly directed into the melting zone, and there achieves a residence period during which all the particulate material is subjected to rapid and uniform melting under the concentrated heat of the burning gases, regulating the rate of delivery of the particulate material to the zone, so as to assure a flow of molten glass in a thin layer from the zone down the wall of the chamber, and discharging the molten glass at the lower end of the chamber.

In order to precisely locate the melting zone in the cylindrical upper part of a furnace chamber and to assist in the concentration of the melting gases, the wall of the furnace chamber may be provided with an annular pocket opening into the chamber, and the projected stream of combustion gases and particulate material in suspension delivered into the pocket. By using a pocket in the furnace chamber, fall of free silica into the molten glass leaving the furnace chamber is prevented.

From this aspect the process of producing molten glass from particulate glass making material according to the invention may be further characterised in that the melting zone is constituted in a pocket in the cylindrical upper part of the furnace chamber said pocket opening towards the chamber axis, and by the products of combustion being projected tangenetially to the chamber wall in the zone.

Accordingly, the present invention comprehends a process of producing molten glass from particulate glass making material comprising the steps of projecting combustion gases into a cylindrical melting zone in a furnace chamber, said melting zone being constituted in a pocket around the cylindrical wall of the chamber and opening towards the chamber axis, the gaseous products of combustion being projected tangenially to the chamber wall in the zone, delivering the whole of particulate glass making material in a gaseous stream into the pocket, so as to achieve a residence period in the pocket at the high temperature of the melting zone regulating the rate of delivery of the particulate material to the pocket so as to assure a flow of molten glass in thin layer form from the pocket down the wall of the chamber and discharging the molten glass and the products of combustion at the lower end of the chamber. Preferably, in this embodiment of the invention, the delivered suspended (or dispersed) particulate material is projected into the zone by using gases of combustion projected into the zone as the vehicle for the particular material.

The residence time is an important factor in determining the state of the molten glass flowing away from the pocket, and hence in determining the extent of any subsequent heat treatment of the molten glass for fining.

By varying the angle to the horizontal at which the projectors are set to deliver the gaseous products of combustion into the melting zone, the pitch of the helix traversed by the gases can be adjusted and accordingly the intensity of heat in the zone regulated, in particular the control of the temperature in the melting zone can be regulated by adjustment of the set of the projectors when the zone is constituted within a pocket in the furnace chamber as hereinbefore described.

The wall of a furnace chamber used in carrying out the present invention may be heated so as to maintain the glass flowing from the pocket at an elevated temperature so that fining of the molten glass may be achieved as it flows in a thin layer down the wall of the furnace and before the glass leaves the chamber.

The present invention also provides a furnace structure for producing molten glass according to the process of the present invention comprising a furnace chamber arranged symmetrically about a vertical axis, an annular pocket in the chamber wall opening towards the axis of the chamber, gas projectors entering the pocket, regulatable means for feeding combustible gas and the material to be melted to the projectors, the projectors being disposed so that the mixture is delivered tangentially of the pocket wall.

In order that the invention may be more clearly understood reference will now be made to the accompanying diagrammatic drawings which show by way of example preferred embodiments of the invention in a furnace structure in which the melting zone is constituted in a pocket located in the upper part of a cylindrical furnace.

Figure 2:
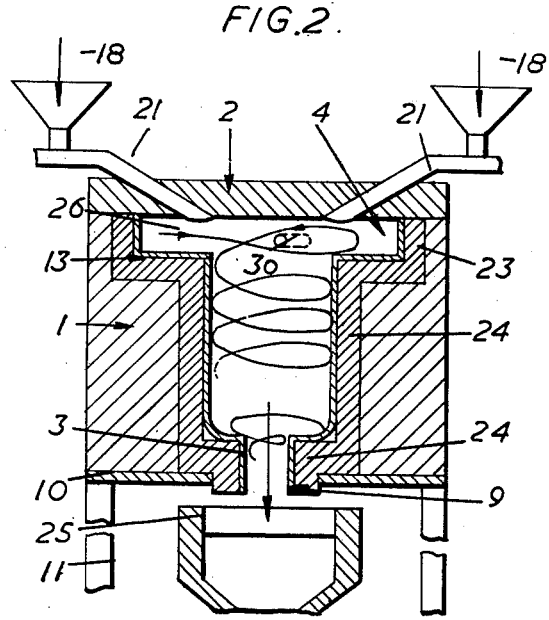
Figure 3:
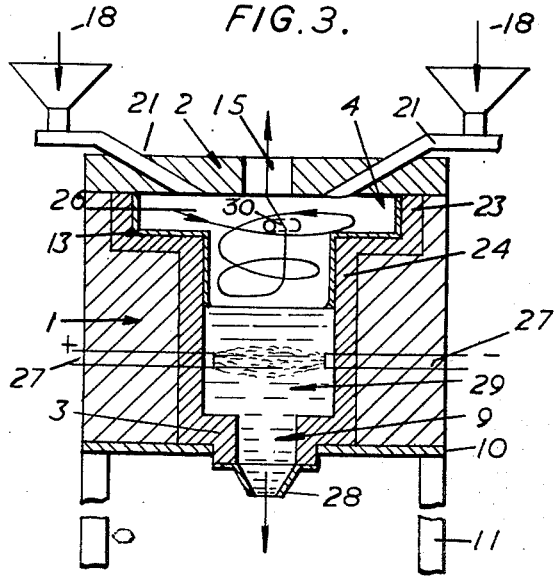

In the drawings FIGURE 1 is a central sectional elevation through the furnace structure;

FIGURE 2 is a diagrammatic central sectional elevation indicating the manner of working the furnace shown in FIGURE 1, and FIGURE 3 is a view similar to FIGURE 2 but relating to modifications in the constituents shown in FIG. 1.

In the drawings like references designate similar parts.

In the construction illustrated in FIGS. 1 and 2 the furnace structure includes a cylindrical wall 1 defining the form of the furnace chamber, a crown 2, and a base 3 to the chamber, and in the wall 1 and in the upper part of the structure is an annular outwardly-extending material-retaining pocket 4 which opens towards the axis 5—5 of the furnace and provides a material-retaining shelf 4a.

The wall 1 is formed of heat insulating material and is provided with a refractory lining 6, e.g. of sillimanite, the lining having an outward flange 7 at the top to form the inner part of the floor of the pocket 4, the lower part of the lining joining the base 3, which latter is centrally apertured as indicated at 8 to form an axial outlet from the furnace chamber. A spout 9 coaxial with the aperture 8 is mounted in the base 3, and the whole furnace structure is mounted on a bridge 10 carried by piers 11.

Recessed in the upper part of the furnace wall is a refractory ring 12 having an inward flange 13 within which the lining flange 7 is countersunk, the flanges 7 and 13 together constituting the whole floor of the pocket 4 of which the outer wall is comprised in the ring 12. In the construction shown the surfaces of the flanges 7 and 13 are flat and on a plane at right angles to the axis of the chamber thus forming a shelf 4a within the furnace. However, the surfaces may be concave and confluent so that the floor is in nature a fluid holding channel in the upper part of the furnace.

The top of the pocket is constituted by the crown member 2 of the furnace chamber which crown is carried on the wall 1, and preferably has a central aperture 15 normally closured by a plug element 16.

The batch material to be melted in the furnace to form molten glass is supplied to a funnel 17 within which is an agitator 18 for maintaining a smooth flow of the material from the funnel to a mixing chamber 19 through which air under pressure is passed, the air being delivered through a pipe line 20. The batch may be fed by an Archimedean screw feeder, itself well known, into the mixing chamber comprising a venturi through which the air passes at sufficiently high velocity to propel forwardly the batch particles.

The material is thus brought into suspension in particulate form in the air stream which passes through a projector 21 which latter enters the pocket 4 through the crown 2, and combustible gas is fed to the mixture of air and material in suspension through a pipe 22 leading into the projector 21. The batch material is thereby transported pneumatically by the air stream to the burning gases delivered into the pocket 4 by the projector 21.

Thus the products of combustion and the material to be reduced to a molten state are delivered into the pocket 4 around which they swirl until the material in a molten state, indicated, at 23, flows from the floor 7, 13 of the pocket down the wall of the furnace to form a thin layer 24, i.e. about one tenth of an inch thick, of molten glass which finds its way to the outlet 8 of the furnace, where it is collected, outside the furnace, in any convenient receptacle, for example a pot 25 which may be used in the process of refining the glass delivered into it.

In the construction illustrated in FIG. 1 only one projector is shown but two projectors 21 are employed at opposite ends of one diameter of the crown as clearly indicated in the diagram of FIG. 2, and each projector is set at an inclination of about 20 to 30° to the horizontal so that the whole of the projected volume is delivered into the pocket, substantially tangentially to the ring 12. By reducing the angle the swirling motion imparted to the mixture entering the pocket is increased.

The combustible gas supplied through pipe 22 to the projector may be the ordinary mains town gas and the gas temperature created in the pocket about 1500°–1700° centigrade.

From the foregoing it will be observed that the particulate glass making material fed to the furnace is injected tangentially, the burner injectors 21, into a rotating stream of burning gases contained in the annular pocket 4, the path of which is graphically shown at 26 in FIG. 2, and is rapidly deposited on the wall 12 of the pocket by centrifugal force.

Partially molten material flows down the wall in a thin film and then along the horizontal floor 13, 7 of the pocket, during which time chemical reaction and dissolution of solid particles are substantially completed. Unrefined glass flows from the pocket into the lower part of the furnace where partial or complete fining is effected. Batch particles normally remain in the gas stream for only a fraction of a second and are in general deposited on the vertical wall of the pocket before completing one revolution, deposition time being controlled by the position of the burner-injectors, the size and density of the batch particles and the angular velocity of the hot gases.

Residence time of the batch material within the pocket is controlled by the feed rate, the glass temperature and the dimensions of the pocket. Film thickness on the vertical walls is determined by feed rate and glass temperature; that on the horizontal floor by the feed rate, temperature, and the annular width of the floor. In normal operation, the residence time in the pocket is 5–10 minutes, the vertical film thickness on the wall 12, $\frac{1}{10}$–$\frac{1}{4}$", and the film thickness on the floor $\frac{1}{4}$"–$\frac{3}{4}$".

In the alternative arrangement indicated in the diagram of FIG. 3, the outlet 9 is provided with a restricted outlet spout 28 the rate of flow through which assures the maintenance of a pool 29 of molten glass within the furnace, and electrodes 27 are employed to fine the whole of the pool by heating by "Joule" effect so that only fined glass leaves the furnace. In the construction shown in FIGS. 1 and 2, the outlet for the burnt gases is in the lower part of the furnace but in the construction shown in FIG. 3 the outlet is through the aperture 15 in the furnace cover 2.

Accordingly in the construction described the pocket 4 functions to collect the batch particles, to provide sufficient time for completion of melting, and to control the flame path, and the lower part of the furnace acts as a partial or complete fining unit.

By means of the present invention, high rates of heat transfer are achieved through the action of high speed, high temperature combustion gases on a large surface area of batch, which is exposed to the furnace atmosphere in the first place as individual particles, and then as a thin film on the wall. Melting is, therefore, not only rapid but is uniform throughout the whole batch.

The rapid melting due to the efficient heat exchange which is obtained by employing particulate batch material in suspension in the swirling burner gases, and also the overall heat treatment to which the batch material is subjected in the interval between being supplied to the furnace and being discharged therefrom as molten glass may be closely regulated.

Various stages in the glass melting process, therefore, take place in well defined zones, the position of which can be readily controlled. Film thickness, speed of flow and residence time in the furnace can be altered to give the glass any desired treatment. All parts of the glass follow a similar flow path, and therefore, receive the same treatment. Changes of glass type or in rate of production can be carried through in times little greater than the residence period of glass within the unit.

In a modified form of the furnace herein described the refractory lining 6 and the refractory ring 12 may be cast or moulded as a monolithic integer of the furnace and inside surface of such unit may have a platinum lining to stand up to the furnace temperature. In another modification, the roof 2 is cast or moulded with the refractory lining 6 and ring 12 to form a unitary integer of the furnace.

In the construction shown the inlet 30 is tangentially arranged in the wall of the melting zone so that the pneumatically introduced particulate material enters the melting zone tangentially to the wall thereof in between the injectors 21 and a second inlet, not shown diametrically opposite the inlet 30 shown in the drawings may be provided so that the inlets for the particulate material alternate with the inlets for the combustion gases and all the inlets 30 direct fluid passing through them tangentially into the melting zone.

A furnace construction according to the present invention may, instead of having only two projectors 21 as already described, have three or more such projectors which preferably are equally spaced from one another. Alternatively, pairs of projectors at different levels may be employed to create the melting zone.

The expressions "glass making materials" or "batch material" or "batch" used in the foregoing description comprehend a glass making particulate material with or without cullet in finely divided form.

We claim:

1. A process of producing molten glass from particulate glass-making material which comprises delivering all the particulate material in gaseous suspension tangentially into a melting zone defined by an outwardly-extending exterior annular pocket including an outer cylindrical wall and a floor adjoining the said wall and having an annular inner edge substantially level with a lower portion of said outer wall, in the cylindrical upper part of a furnace chamber, said pocket opening toward the axis of the chamber, directing the delivery of gases and particulate material tangentially into an upper part of the pocket and in the vicinity of the inner face of the said cylindrical wall at a low angle of inclination to the floor of the pocket, and maintaining the particulate material within said pocket and circulating it in a helical path therein at a temperature of at least 1500° C. for a sufficient residence period to uniformly melt all the particulate material while in said pocket, regulating the rate of delivery of the particulate material so as to maintain a flow in thin layer form of molten glass from the pocket down the wall of the chamber, and discharging the molten glass at the lower end of the chamber.

2. A process of producing molten glass from particulate glass making material according to claim 1 wherein the delivered particulate material is projected into the zone by using products of combustion projected into the zone as the vehicle for the particulate material.

3. A process of producing molten glass from particulate glass making material according to claim 1 wherein the molten glass is collected near the bottom of the furnace chamber and is maintained at an elevated temperature by energising electrodes submerged in the collected glass so as to be heated by Joule effect to complete fining.

4. Apparatus for producing molten glass from particulate glass-making material, comprising a furnace chamber arranged symmetrically about a vertical axis and providing at an upper portion thereof a melting zone defined by an outwardly-extending exterior annular material-retaining pocket opening toward the axis of said chamber and including a cylindrical outer wall and a floor adjoining said wall and having an annular edge level with a lower portion of said wall, means to deliver particulate material in gaseous suspension tangentially into said melting zone and not elsewhere, means to direct the delivery of gases and particulate material tangentially into an upper part of said pocket and in the vicinity of the inner face of said cylindrical wall and at a low angle of inclination to said floor, and means to control such delivery to maintain the particulate material within said pocket and to circulate it in a helical path for a sufficient residence period to uniformly melt all the particulate material while in said pocket and to maintain a flow of molten glass in thin layer form from said pocket down the wall to the chamber below the same, and means for the discharge of molten glass at a lower portion of said chamber.

5. A furnace structure for producing molten glass from particulate glass-making material comprising a furnace chamber arranged symmetrically about a vertical axis, said chamber including an annular outwardly-extending material-retaining pocket constituting a melting zone for the glass-making material, said pocket consisting of a vertical outer wall and adjoining upper and lower walls, said lower wall having an inner edge at least as high as the lower edge of said outer wall to constitute a material-retaining shelf, projectors tangentially disposed with respect to the vertical wall of the pocket and opening only into the pocket in the vicinity of the inner face of the vertical wall, and regulatable means for pneumatically supplying the particulate material to the projectors and for mixing combustible gases with the fluid stream of particulate material tangentially projected into the pocket, so that the mixture is forced to circulate in the pocket while a sufficient residence period for the particulate material in the melting zone is achieved.

6. Apparatus according to claim 5 comprising a projector entering into the pocket in the vicinity of the inner face of the vertical wall of the pocket and being inclined at an angle between 20° and 30° to the shelf of the pocket, means for pneumatically supplying the particulate material through the last-mentioned projector and means for mixing the pneumatic fluid with combustion gases in the said last-mentioned projector.

References Cited in the file of this patent

UNITED STATES PATENTS

| | | |
|---|---|---|
| 706,283 | Voelker | Aug. 5, 1902 |
| 1,371,084 | Ferguson | Mar. 8, 1921 |
| 1,500,651 | Smith | July 8, 1924 |
| 1,889,510 | Amsler | Nov. 29, 1932 |
| 2,451,582 | Smith | Oct. 19, 1948 |